United States Patent
Patron et al.

(10) Patent No.: US 11,552,505 B1
(45) Date of Patent: Jan. 10, 2023

(54) MULTI-COIL WIRELESS POWER SYSTEM

(71) Applicant: Verily Life Sciences LLC, South San Francisco, CA (US)

(72) Inventors: Damiano Patron, San Bruno, CA (US); Arvind Govindaraj, San Bruno, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 212 days.

(21) Appl. No.: 16/871,155

(22) Filed: May 11, 2020

Related U.S. Application Data (60) Provisional application No. 62/845,516, filed on May 9, 2019.

(51) Int. Cl.

| | |
|---|---|
| *H02J 50/00* | (2016.01) |
| *H02J 50/40* | (2016.01) |
| *H02J 7/02* | (2016.01) |
| *H01F 38/14* | (2006.01) |
| *H02J 50/80* | (2016.01) |
| *H02J 50/10* | (2016.01) |

(52) U.S. Cl.
CPC .............. *H02J 50/40* (2016.02); *H01F 38/14* (2013.01); *H02J 7/02* (2013.01); *H02J 50/005* (2020.01); *H02J 50/10* (2016.02); *H02J 50/80* (2016.02)

(58) Field of Classification Search
CPC .. H02J 50/40; H02J 7/02; H02J 50/005; H02J 50/10; H02J 50/80; H01F 38/14
See application file for complete search history.

(56) References Cited

U.S. PATENT DOCUMENTS

| | | | |
|---|---|---|---|
| 8,666,491 B2 | 3/2014 | Chen et al. | |
| 9,002,469 B2 | 4/2015 | D'ambrosio | |
| 2013/0043734 A1* | 2/2013 | Stone | H02J 50/40 307/104 |
| 2020/0005988 A1* | 1/2020 | Iyer | A61N 1/3756 |
| 2020/0177027 A1* | 6/2020 | Sato | A61B 5/6861 |

* cited by examiner

*Primary Examiner* — Nghia M Doan
(74) *Attorney, Agent, or Firm* — Kilpatrick Townsend & Stockton LLP (57) ABSTRACT

A wireless power system for an implantable device is described. The system includes multiple inductive charging coils to increase an effective area for receiving an electromagnetic charging field from a wireless charging device. The multiple inductive charging coils produce different alternating current signals in response to receiving the electromagnetic charging field. The system includes a rectifying circuit for rectifying the alternating current signals into direct current signals. The system also includes a current combination circuit for combining the multiple direct current signals into a single direct current for powering an operation of the implantable device. Methods and devices for implementing the power system in an implantable device are also described.

6 Claims, 5 Drawing Sheets

MULTI-COIL WIRELESS POWER SYSTEM

CROSS-REFERENCE TO RELATED APPLICATIONS

This application claims priority to U.S. Provisional Patent Application No. 62/845,516, filed on May 9, 2019, the entire contents of which are hereby incorporated by reference in their entirety.

BACKGROUND

Implantable devices, such as devices implanted in the body of an individual or other living being, may be used for various functions. For example, a neuromodulation device may be implanted to treat a wide range of disorders. As another example, a brain-computer interface may be implanted to augment and/or repair various cognitive and sensory-motor functions. Yet another example is a micro sensor for sensing physiological parameters of an individual. These and other implantable devices may include various subsystems for collecting data, providing outputs based on collected data, performing calculations, and/or carrying out various instructions. Once an implantable device is placed within a user, its battery cannot be easily replaced.

Various techniques and systems exist for powering an implantable device. One technique includes providing power to an implantable device through wireless power transfer using electromagnetic waves. These systems typically use near-field inductive coils for charging the battery of the implantable device.

SUMMARY

Various examples are described relating to charging of implantable devices using wireless charging systems. In an example, an implantable device, includes: a housing and a substrate connected to a first portion of the housing, the substrate including: a first receiving coil disposed adjacent to a perimeter portion of the substrate. The substrate also includes a communication device disposed adjacent to a central portion of the substrate. The implantable device also includes a second receiving coil connected to a second portion of the housing, where the first receiving coil produces a first alternating current and the second receiving coil produces a second alternating current, and the first receiving coil and the second receiving coil inductively couple with a wireless charger in response to the wireless charger outputting an electromagnetic field. The implantable device also includes a current combination circuit electrically connected to the first receiving coil and the second receiving coil, the current combination circuit configured to combine the first alternating current and the second alternating current. Other embodiments of this device include corresponding devices and systems each configured to perform the actions of the methods.

Implementations of the example implantable device may include one or more of the following features. A first shape of the substrate corresponds to a second shape of the first portion of the housing. The implantable device may further include a third receiving coil connected to a third portion of the housing. The third receiving coil produces a third alternating current. The third receiving coil inductively couples to the wireless charger in response to the wireless charger outputting the electromagnetic field. The current combination circuit is electrically connected to the third receiving coil and further configured to combine the third alternating current, the first alternating current, and the second alternating current. The current combination circuit includes at least one rectifier and at least one current converter. The current combination circuit produces a charging current for charging a battery of the implantable device. The first receiving coil has a first orientation about perpendicular to the first portion of the housing and the second receiving coil has a second orientation, the first orientation different from the second orientation. The first receiving coil and the second receiving coil receive the electromagnetic field at about the same time.

In another example, a power system for an implantable device includes a first receiving coil disposed on a first side of a housing of the implantable device, where the first receiving coil produces a first alternating current at a first time when the first receiving coil is inductively coupled to a wireless charger. The power system also includes a second receiving coil disposed on a second side of the housing, where the second receiving coil produces a second alternating current at the first time when the first receiving coil is inductively coupled to the wireless charger. The power system also includes a current combination circuit electrically connected to the first receiving coil and the second receiving coil, the current combination circuit configured to combine the first alternating current and the second alternating current to produce a direct current. Other embodiments of this system include corresponding devices and systems each configured to perform the actions of the methods.

Implementations of the example power system may include one or more of the following features. The current combination circuit may include at least one rectifier. The power system may also include at least one current converter. The direct current charges a battery of the implantable device and/or provides power for an operation of the implantable device. The first receiving coil is oriented in a first direction about perpendicular to the first side of the housing and the second receiving coil is oriented in a second direction, and the first direction is about parallel to the second direction or differs from the second direction.

In another example a method of manufacturing a charging system for an implantable device includes providing a housing for supporting implantable device components. The method of manufacturing also includes connecting the implantable device components to the housing; forming an auxiliary charging component by at least: providing a substrate and forming a first receiving coil on the substrate at a perimeter portion of the substrate, the first receiving coil electrically connected to the implantable device components. The method of manufacturing also includes connecting the auxiliary charging component to the housing at a first side of the housing. The method of manufacturing also includes connecting a second receiving coil to the housing at a second side of the housing, the second receiving coil electrically connected to the implantable device components. Other embodiments of this method include corresponding devices and systems each configured to perform the actions of the methods.

Implementations of the method of manufacturing a charging system may include one or more of the following features. Connecting the implantable device components to the housing includes connecting a rectifier and a current converter to a mounting plate. The method may also include enclosing the implantable device components connected to the mounting plate with the housing. The first receiving coil being electrically connected to the implantable device components includes the first receiving coil being electrically connected to a rectifier configured to receive an alternating current and output a direct current. The method may further include connecting the second receiving coil to the rectifier and connecting the rectifier to a current converter. The rectifier may be a first rectifier; and the method further includes connecting the second receiving coil to a second rectifier. The method may also include connecting the first rectifier and the second rectifier to a current converter, the current converter configured to combine electrical signals from the first rectifier and the second rectifier and output a single current. The method further including connecting a third receiving coil to the housing at a third side of the housing, the third receiving coil electrically connected to the implantable device components. The method where forming the first receiving coil includes depositing a continuous conductive material in a helical pattern at the perimeter portion of the substrate.

In another example, an implantable device includes a housing cover that secures to a mounting plate. The implantable device also includes at least two receiving coils disposed on exterior surfaces of the housing cover, where each receiving coil of the at least two receiving coils produces an alternating current in response to inductively coupling to a wireless charger. The implantable device also includes a combination system connected to the mounting plate and enclosed within the housing cover, the combination system electrically connected to each receiving coil and configured to receive the alternating current from each receiving coil and output a single current. Other embodiments of this implantable device include corresponding devices and systems each configured to perform the actions of the methods.

Implementations of the implantable device may include one or more of the following features. The implantable device where the at least two receiving coils produce the alternating current at about the same time. The combination system may include at least one rectifier and at least one current converter. A receiving coil of the at least two receiving coils is disposed on a substrate containing a communication device. The at least two receiving coils may include six receiving coils. The mounting plate and the housing cover together define six exterior surfaces. One receiving coil of the six receiving coils is disposed on each of the six exterior surfaces. The single current charges a battery of the implantable device and/or supplies power for an operation of the implantable device.

In yet another example, an implantable device includes a housing and a first receiving coil connected to a first external surface of the housing oriented in a first direction. The implantable device also includes a second receiving coil connected to a second external surface of the housing oriented in a second direction. The implantable device also includes a current combination circuit electrically connected to the first receiving coil and the second receiving coil, the current combination circuit configured to combine electrical signals from the first receiving coil and the second receiving coil to produce a single current. Other embodiments of this implantable device include corresponding devices and systems each configured to perform the actions of the methods.

Implementations of the implantable device may include one or more of the following features. The first direction is about parallel to the second direction or the first direction is different from the second direction. The implantable device further includes a third receiving coil connected to a third external surface of the housing oriented in a third direction. The third receiving coil is electrically connected to the current combination circuit and the third direction is different from the first direction and the second direction. The current combination circuit includes a first rectifier electrically connected to the first receiving coil and may include a second rectifier electrically connected to the second receiving coil. The implantable device may also include a current converter, with the first rectifier, the second rectifier, and the current converter arranged in series. The current combination circuit includes a first rectifier electrically connected to the first receiving coil and a second rectifier electrically connected to the second receiving coil. The implantable device may also include a current converter, with the first rectifier and the second rectifier arranged in parallel and electrically connected to the current converter.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of wireless charging of and power supply to an implantable device. Those of ordinary skill in the art will realize that the following description is illustrative only and is not intended to be in any way limiting. For example, charging systems and techniques described herein can be used with a variety of wireless chargers, though for convenience an inductive charging device is described. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Implantable devices can include mechanical, electrical, and pharmaceutical stimulators and typically use electrochemical cells (e.g., batteries) for energy to cause stimulation. Rather than requiring surgery to remove and replace expired batteries, wireless charging systems can be used to supply energy to the implantable device to recharge the batteries. In wireless charging systems, a charger includes a charging coil configured to inductively transfer wireless energy by inducing voltage in a receiving coil of an implantable device. The induced voltage is a function of a changing electromagnetic (EM) field, resulting in a changing EM flux passing through the loop formed by the receiving coil as described by Faraday's law.

In general, increasing a number of windings in a charging coil and/or increasing the EM flux through the coil will increase the induced voltage (e.g., electromotive force (EMF)) of a given coil. The EM flux can be affected at the charger side, by increasing the strength of the EM field or at the receiver side by increasing the area of the receiving coil. Elements of the present disclosure relate to effectively increasing the area and the number of coils or windings of receiving coils by introducing additional coils covering the surface of the implantable device.

Because an implantable device is intended to be implanted inside the body of a user, it is beneficial to keep the size and/or the footprint of the implantable device as small as possible. This size limitation prevents the use or inclusion of additional large components or components that significantly add to the size of the implantable device. The systems and methods described herein provide an increased EMF while limiting the size of the implantable device.

The system described herein provides an increased EMF for charging an implantable device by providing multiple receiving coils to simultaneously receive EM flux from a wireless charger. The system is compatible with any EM field producing charger. The system is designed to provide the increased EMF without an increase in power to or through a wireless charger. This is achieved, in part by effectively increasing an overall receiving coil area by introducing multiple receiving coils to receive the EM field without increasing the footprint or size of the implantable device.

Power may be provided through an EM field produced by a wireless charger and harvested by the receiving coils of the device described herein. A rectifier and/or a regulator may be incorporated with the electronics of the implantable device to rectify an alternating current (AC) signal produced by the receiving coils in response to the interaction of the EM field with the receiving coils. The rectifier generates a stable direct current (DC) voltage that may be used to power the implantable device and/or recharge a battery of the implantable device.

In an illustrative example, an implantable device includes a primary receiving coil, a rectifier, a battery, a communication device, a secondary receiving coil, a second rectifier, and a current combination device. The primary receiving coil and the secondary receiving coil both receive a transmitted wireless charging field such as an EM field, which induces a current in the receiving coils. For example, the primary receiving coil and the secondary receiving coil each receive the same transmitted charging field at the same time and each produces a current as a result of the transmitted charging field. The primary receiving coil may receive a portion of the transmitted charging field while the secondary receiving coil may receive another portion of the transmitted charging field that would otherwise not be received or used by the implantable device, thereby increasing the energy transfer to the implantable device. The rectifiers, which are electrically connected to the receiving coils, receive an alternating current induced in the receiving coils and converts the alternating current into a single direct current and/or a single current which is better suited for charging the battery of the implantable device. The primary receiving coil and the first rectifier are electrically connected to the current combination device and the secondary receiving coil and second rectifier are also connected to the current combination device through a separate electrical connection, though in some embodiments the primary receiving coil and the secondary receiving coil may connect to the current combination device through a single electrical connection. The current combination device receives the direct current from the first rectifier and the second rectifier and combines the two direct currents to produce a single charging current which may then be used to charge the battery of the implantable device.

The primary receiving coil of the implantable device is positioned adjacent to a main housing of the implantable device, within a cover but outside a metal canister of the implantable device. The secondary receiving coil is positioned on a printed circuit board (PCB) formed of a ceramic or other bio-compatible material. The secondary receiving coil and PCB are connected to the metal canister of the implantable device and oriented in the same direction as the primary receiving coil. The PCB also includes a communication device, such as a Bluetooth antenna. The Bluetooth antenna is located in a center portion of the PCB while the secondary receiving coil is deposited around the perimeter of the PCB to maximize the area enclosed by the secondary receiving coil.

In this illustrative example, a charging coil of a wireless charger produces an EM field in the vicinity of the implantable device. The primary receiving coil and the secondary receiving coil will each produce an alternating current based on the changing EM field. In some implantable devices, a primary receiving coil generates an alternating current alone. In this illustrative example, both the secondary receiving coil and the primary receiving coil produce an alternating current based on the same EM field at the same time. The result is greater energy received from the EM field and transferred to the implantable device through the use of multiple simultaneous coils in a single EM field.

In another illustrative example, an implantable device includes a first coil, a second coil, a rectifier circuit, and a current combination circuit. The first coil and the second coil are positioned on external surfaces of the implantable device. The first coil and the second coil are oriented in different directions, e.g., the coils can be directed in non-parallel directions. In this example, the first and the second coils are each able to receive portions of an EM field which may not be available or possible to receive with the other. For example, the first coil may be perpendicular to the second coil and therefore the second coil may be capable of receiving an EM field that is not perfectly oriented with the first coil. In this example, the addition of the second coil serves to receive the wireless charger's EM field even when the alignment is less than optimal.

The examples described herein make it possible to capture EM flux for charging an implantable device that would otherwise be lost to the environment and unused for powering and/or charging the implantable device. The additional EM flux captured through the multiple receiving coils increases energy delivery to the implantable device and may therefore reduce charging times for recharging a battery of the implantable device and/or to perform other powered functions. The introduction of multiple receiving coils makes it possible to achieve similar or even higher levels of energy from the EM field when alignment is sub-optimal without having to perfectly align or be concerned with movement of the implantable device within a patient. The multiple receiving coils reduces the importance of perfect initial placement of the implantable device, and additionally provides flexibility to still effectively provide power to the implantable device in the event the implantable device shifts and/or rotates during use.

These illustrative examples are given to introduce the reader to the general subject matter discussed herein and the disclosure is not limited to these examples. The following sections describe various additional non-limiting examples of multi-coil wireless charging systems and methods for wirelessly charging implantable devices.

Figure 1:
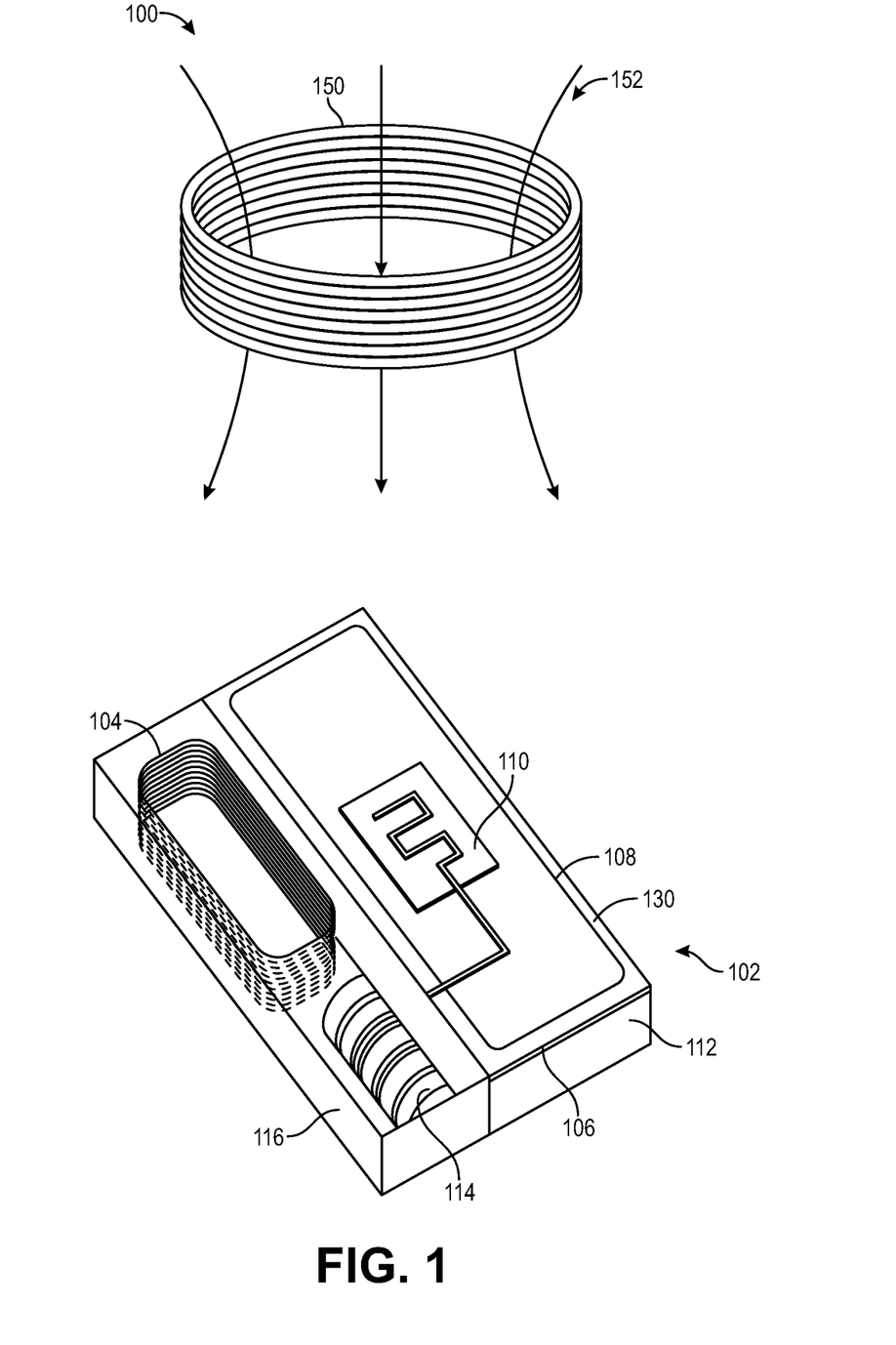
FIG. 1 illustrates a wireless charging system for providing wireless power to an implantable device according to at least one example.

Referring now to FIG. 1, a wireless power system 100 for an implantable device is shown. The wireless power system 100 includes a wireless charger (not shown) having a wireless charging coil 150 and an implantable device 102 having multiple receiving coils for charging. The implantable device 102 includes a primary receiving coil 104 and a secondary receiving coil 108. The primary receiving coil 104 and the secondary receiving coil 108 receive a transmitted charging field 152 such as a changing EM field, which induces a current in the receiving coils. The charging field 152 is produced by a wireless charger, and specifically by the wireless charging coil 150. While one wireless charging coil 150 is shown in FIG. 1, it should be understood that the wireless charger may also include more than one wireless charging coil 150 that together and/or separately produce the charging field 152. In at least one example, the wireless charger operates at a frequency of 6.78 MHz. In some other examples, the wireless charger may follow or use a Qi inductive standard, Alliance for Wireless Power (A4WP) standard, Power Matters Alliance (PMA) standard, or any other suitable standard relating to wireless charging of electronic device. In other examples, the wireless charger may also be a magnetic resonance charger and/or support other forms of wireless charging such as ultrasonic charging.

The implantable device 102 includes a number of components such as control circuitry, a battery, and a microprocessor (not shown). The primary receiving coil 104 is positioned on one side of the implantable device 102. The primary receiving coil 104 is a solenoid coil, e.g., a coil of conductive material wound into a tightly packed helix, in this example. In other examples, the primary receiving coil 104 may have other configurations, such as a single loop of conductive material, numerous loops and/or windings which are not stacked in a solenoid coil configuration, and an open shape configurations wherein the loops and/or windings are wound in more than one orientation. The primary receiving coil 104 is electrically connected to circuitry of the implantable device 102. The circuitry may be within a canister 112 of the implantable device 102 while the primary receiving coil 104 is positioned on the exterior of the canister 112.

The primary receiving coil 104 is positioned within the housing 116 adjacent to the canister 112 and configured to receive EM energy via an EM field, e.g., such as one produced by a wireless charger. The primary receiving coil 104 may include coil windings that substantially fit the given shape of the housing 116. For example, in a situation where the housing 116 includes a changing cross section, e.g., a tapered shape, the coil windings may include a first portion of coil windings having a first shape and/or size, and may also include a second portion of coil windings having a second shape and/or size different from the first portion of coil windings. The primary receiving coil 104 may be made from wound wire, a continuous conductive material, and/or may take the form of traces on an interior flexible printed circuit board (PCB) which are then folded. The primary receiving coil 104 may take other forms as well. For example, the receiving coils may be formed into a helical pattern using the wire or conductive material.

The windings of the primary receiving coil 104, when assembled into the implantable device 102, are positioned proximate and/or adjacent to a peripheral portion of the housing 116 in this example. The area enclosed by the primary receiving coil 104 can be maximized by placing and/or running the windings of the primary receiving coil around the perimeter of the housing 116. The windings of the primary receiving coil 104 can be configured differently depending on the application. For example, the primary receiving coil 104 can include figure-eight windings, multiple discrete sets of windings, windings having a rectangular shape, windings having an elliptical shape, or other patterns, shapes, or configurations. In some examples, the primary receiving coil 104 can have a substantially rectangular shape and a size of approximately 26 millimeters by 19 millimeters, corresponding to an internal shape and size of the periphery of the housing 116 of the implantable device 102. In other examples, the primary receiving coil 104 can have a substantially ovular or circular shape. The primary receiving coil 108 may have a diameter in a range of 5 millimeters to tens of millimeters, for example, 20 millimeters, 30 millimeters, 40 millimeters, 50 millimeters, 60 millimeters, 70 millimeters, 80 millimeters, 90 millimeters, and/or 100 millimeters. The shape, size, number of windings, and other properties of the primary receiving coil 104 can be specified such that the primary receiving coil 104 is able to receive EM energy having a specified frequency. The specified frequency can be in a range of 100 kilohertz to 50 megahertz. In some examples, the specified frequency can be specified to comply with one or more wireless charging standards (e.g., the Qi wireless charging standard).

The secondary receiving coil 108 is also a solenoid coil, but in at least one example contains fewer windings than the primary receiving coil 104. In some examples the primary receiving coil 104 and the secondary receiving coil 108 may have a similar number of windings. The secondary receiving coil 108 is positioned on a printed circuit board (PCB) 106 made of a bio-compatible material, such as a ceramic substrate. The secondary receiving coil 108 is deposited adjacent to, proximate to, beside, contiguous with, adjoining, and/or near the perimeter portion 130 of the PCB 106, which has a shape that matches or nearly matches the shape of the canister 112 of the implantable device 102. The secondary receiving coil 108 may be deposited at the edge of PCB 106 or offset from the perimeter portion 130 of the PCB 106, such as being positioned 1 mm to 10 mm from the perimeter portion 130. By using a PCB 106 that matches or nearly matches the footprint of the implantable device 102, the area of the secondary receiving coil 108 is made as large as possible without expanding or enlarging the implantable device 102.

The secondary receiving coil 108 may include as few as one or two windings of conductive material, or may include numerous windings, exceeding 10 to 50 windings. The secondary receiving coil 108 serves to increase the area through which the EM field may be received without requiring any change in the wireless charger and/or EM field. For example, the secondary receiving coil 108 increases the portion of the EM received for charging or powering the implantable device 102 without requiring a change in the wireless charger, thereby receiving a greater portion of the EM field that is otherwise unused.

The secondary receiving coil 108 can be configured to rest on the exterior of the canister 112 to increase the area enclosed by the secondary receiving coil 108 while remaining on the PCB 106. The windings of the secondary receiving coil 108 can be configured differently according to an application. For example, the secondary receiving coil 108 can include figure-eight windings, multiple discrete sets of windings, windings having a rectangular shape, windings having an elliptical shape, or other patterns, shapes, or configurations according to an application.

The primary receiving coil 104, and the secondary receiving coil 108, are connected to the circuitry of the implantable device 102 so that electrical signals from the receiving coils can be rectified and combined together using the circuitry of the implantable device 102. The circuitry may be within a canister 112 of the implantable device 102 while the secondary receiving coil 108 is positioned on the exterior of the canister 112. The primary receiving coil 104, and the secondary receiving coil 108, are connected to the circuitry of the implantable device 102 so that electrical signals from the receiving coils can be rectified and combined together using the circuitry of the implantable device 102. In some instances, the primary receiving coil 104 and the secondary receiving coil 108 are connected to the same components within the circuitry of the implantable device. In some other examples, the primary receiving coil 104 and the secondary receiving coil 108 are connected to different components of the circuitry. For example, The primary receiving coil 104 and the secondary receiving coil 108 are each connected to a rectifier circuit, containing one or more rectifiers combined either in parallel or in series. The primary receiving coil 104 and the secondary receiving coil 108 are each configured to output an alternating current in response to receiving the EM field produced by the wireless charger. The alternating current produced by each of the receiving coils is then rectified at the rectifier circuit before being combined at a current combination circuit, as shown, for example, in FIG. 4 and described elsewhere herein. The end result is a unified direct current capable of powering and/or charging the implantable device 102. The secondary receiving coil 108 can, according to some examples, increase the overall power received by the implantable device 102 by over 16%. This increase in power transfer can result in lower charging times, make up for sub-optimal alignment between the wireless charger and the implantable device 102, and in some cases provide sufficient energy to power the implantable device 102 without the use of rechargeable batteries.

The canister 112 may act as a faraday cage e.g., to magnetically shield the components of the implantable device 102 from EM energy so the function and operation of the implantable device 102 is not disturbed, interrupted, or damaged. The primary receiving coil 104 may be within a non-conductive housing 116 such as a bio-compatible plastic or any other non-reactive material through which EM fields may pass relatively unimpeded. In some examples, other components such as a battery, charger, or other device components may be within the non-conductive housing 116 rather than the canister 112. The housing 116 is designed to contain the primary receiving coil 104 and is connected to the canister 112, which may, in some examples be formed from a metal and therefore be unsuitable to contain for the primary receiving coil 104 as it would act as a faraday cage and prevent the EM energy from interacting with the primary receiving coil 104.

In some examples, the canister 112 and housing 116 may be a single cover for containing and protecting the implantable device components. The implantable device can include one or more magnetic shielding elements contained in the cover and configured to shield the implantable device components from EM energy (e.g., block EM fields). That is, certain components of the implantable device can experience heating or other effects when exposed to EM energy (e.g., a radio-frequency EM field) used for wireless charging. Further, the one or more magnetic shielding elements can be configured to increase the efficiency of energy transfer from a wireless charger to the coil.

The canister 112 may cover and/or occupy a majority of the footprint of the implantable device 102. The canister 112 may include a mounting plate to which the components of the implantable device 102 are connected as well as a canister cover which attaches to the mounting plate to form the canister. In some examples, the canister 112 may cover the entire footprint of the implantable device 102 and form a base layer to which external elements, including those listed below, are attached. In some other examples, the canister 112 and the housing 116 together may form the entire body and/or footprint of the implantable device 102. Other elements, such as receiving coils, antennas, or other components are not contained within the canister 112. Instead, these components can be arranged within a housing 116 adjacent to the canister 112.

Affixed to a top surface of the canister 112 is a PCB 106, which is formed from a bio-compatible material, such as a ceramic. Other bio-compatible substrates and PCB materials known and typically used will be known to those with skill in the art and are intended to be covered by the present description. The PCB 106 includes a secondary receiving coil 108 placed at a perimeter portion 130 of the PCB 106. The PCB 106 also includes a communication device 110 such as a Bluetooth antenna. In some examples, communicating using a short-range communication device such as a Bluetooth Low Energy (BLE) channel can provide advantages such as consuming less power, being able to communicate across moderate distances, being able to detect levels of proximity, achieving high-level security based on encryption and short ranges, and not requiring pairing for inter-device communications. The implantable device 102 may already be configured to communicate with an external device, and the communication device 110 may be configured to communicate on a communication channel typically used by implantable devices.

The secondary receiving coil 108 and the communication device 110 may be deposited, printed, affixed, or otherwise connected to the PCB 106. In some examples, the PCB 106 may be coated with a bio-compatible coating to protect the secondary receiving coil 108, communication device 110, and other components incorporated onto the PCB 106. The communication device 110 and the secondary receiving coil 108 are electrically connected to circuitry within the canister 112 and/or the housing 116. Such circuitry, as described herein, is used for controlling, charging, and communicating different electrical signals for various purposes such as recharging a battery 114 or providing neuromodulation instructions.

The PCB 106 also contains a communication device 110 such as an antenna, e.g., a Bluetooth antenna, or any other short range communication antenna. The communication device 110 is part of the PCB 106 and may be printed onto the board or otherwise connected. The communication device 110 is electrically connected to the internal components of the implantable device 102. The communication device 110 may also include a transceiver for transmitting and receiving communications as well other elements configured to transmit and/or receive data and/or signals.

Figure 2:
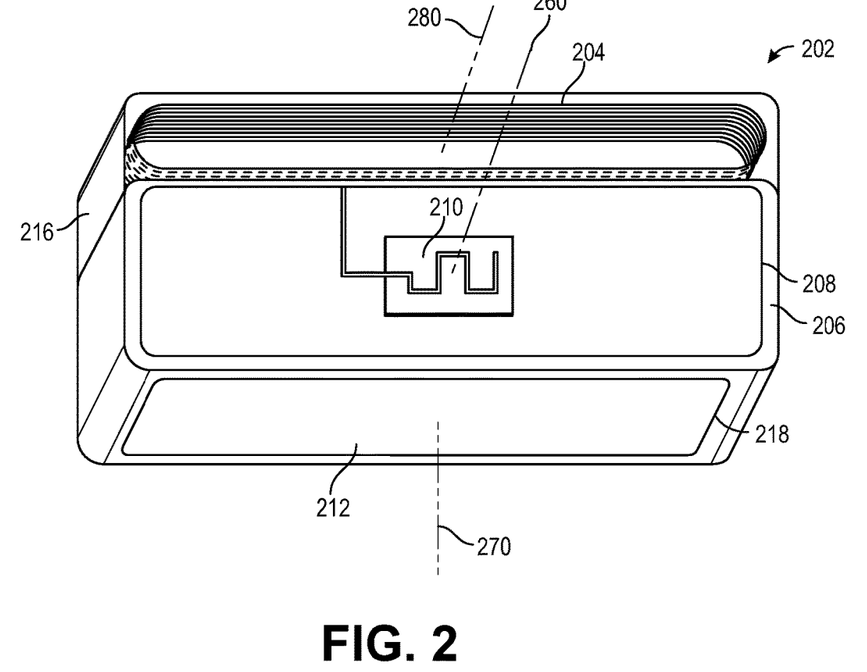
FIG. 2 illustrates an implantable device, according to at least one example.

FIG. 2 shows an example of an implantable device 202 having three receiving coils for charging and/or powering the implantable device 202, according to at least one example. The implantable device 202 includes a canister 212 and a housing 216 similar to the example shown in FIG. 1.

The canister 212 may cover and/or occupy a majority of the footprint of the implantable device 202. The canister 212 may include a mounting plate to which the components of the implantable device 202 are connected as well as a canister cover which attaches to the mounting plate to form the canister. In some examples, the canister 212 may cover the entire footprint of the implantable device 202 and form a base layer to which external elements, including those listed below, are attached. In some other examples, the canister 212 and the housing 216 together may form the entire body and/or footprint of the implantable device 202. The housing 216 is formed of a bio-compatible material that allows penetration or passing of an EM field through it. Within the housing 216 is a first receiving coil 204, which is configured to provide the main power for the implantable device 202. The first receiving coil 204 can be configured in a number of ways to enable efficient reception of EM energy. The windings of the first receiving coil 204 can be positioned proximate and/or adjacent to a peripheral portion of the housing 216 such that an area enclosed by the first receiving coil 204 (e.g., the central portion of the housing 216) is increased.

It should be understood that, the first receiving coil 204 can have a rectangular shape, an elliptical shape, or any other suitable shape according to an application. For example, the shape of the first receiving coil 204 can correspond to the shape of the housing 216 and/or the implantable device 202. For example, the first receiving coil 204 may have a profile, when viewed from at least one perspective, wherein the first receiving coil fits within and/or matches a profile of the housing 216 and/or the implantable device 202. More specifically, the first receiving coil 204 may be wound and/or shaped such that it entirely, or nearly entirely, fills an inner profile or surface of the housing 216, thereby maximizing the area of the first receiving coil 204 within the housing 216.

A second receiving coil 208 is positioned on a PCB 206 connected to a first surface of the canister 212 and having a shape matching or nearly matching the shape of the canister 212. For example, the second receiving coil 208 may have a rectangular shape as shown or any shape to maximize the area enclosed within the second receiving coil 208 without increasing the footprint of the canister 212. The second receiving coil 208 and PCB 206 may be similar to the PCB and secondary receiving coil of FIG. 1. The PCB 206 also includes a communication device 210, such as a Bluetooth antenna as described above.

A third receiving coil 218 is deposited on a third surface of the canister 212. The third receiving coil 218 may be connected directly to the canister 212 and covered with a bio-compatible covering or may be printed or otherwise connected to a PCB in a manner similar to the second receiving coil 208. The third receiving coil 218 is oriented in a direction different from the first receiving coil 204 and the second receiving coil 208. In some examples the third receiving coil 218 may be oriented in the same direction as the first receiving coil 204 and/or the second receiving coil 208. As shown in FIG. 2, the first receiving coil 204 and the second receiving coil 208 are oriented in a similar direction, while the third receiving coil 218 is oriented perpendicular to the first receiving coil 204 and the second receiving coil 208. The different orientation of the third receiving coil 218 enables the third coil to receive portions of the EM field which may not be receivable by the first receiving coil 204 and the second receiving coil 208. For example, a portion of the EM field may run along a plane on which a winding of the second receiving coil 208 lies, such as the plane of the PCB 206. Because the EM field passes along the plane of the second receiving coil 208 but does not pass through the loop formed by the second receiving coil 208, the energy carried by that portion of the EM field will not induce a current in the second receiving coil 208. However, the third receiving coil 218 is oriented such that a portion of the EM field which does not pass through the loop of the second receiving coil 208 will still pass through the loop formed by the third receiving coil 218, thereby inducing a current in the third receiving coil 218.

The first receiving coil 204 has a first center axis 280 extending in a first direction. The second receiving coil 208 has a second center axis 260 extending in a second direction. As shown in FIG. 2, the first direction and the second direction are parallel and/or in a similar direction. In some other examples, the first direction may be different from the second direction. For example, the first direction may differ from the second direction by a few degrees or by even more, such as when the first direction and the second direction are perpendicular to each other. The external surface geometry of the implantable device may have a curvature or angle which results in the first direction and the second direction differing by only a few degrees.

The third receiving coil 218 has a third center axis 270 extending in a third direction. The third center axis and third direction may be different from both the first direction and the second direction. In some examples, the third direction may be the same or similar to at least one of the first direction and/or the second direction. As shown in FIG. 2, the third direction is perpendicular or nearly perpendicular to the first direction and the second direction. As described above, the difference between the third direction and the first and/or second direction may vary and be any angle including perpendicular, an acute angle, an obtuse angle, or a parallel or zero difference.

Each of the first receiving coil 204, second receiving coil 208, and third receiving coil 218 are electrically connected to a rectifier circuit (not shown) and current combination circuit (not shown), discussed in detail below with respect to FIG. 4. The rectifier circuit and current combination circuit enable the alternating currents induced at each of the three coils to be combined to a single DC current for powering and/or charging the implantable device 202.

Figure 3:
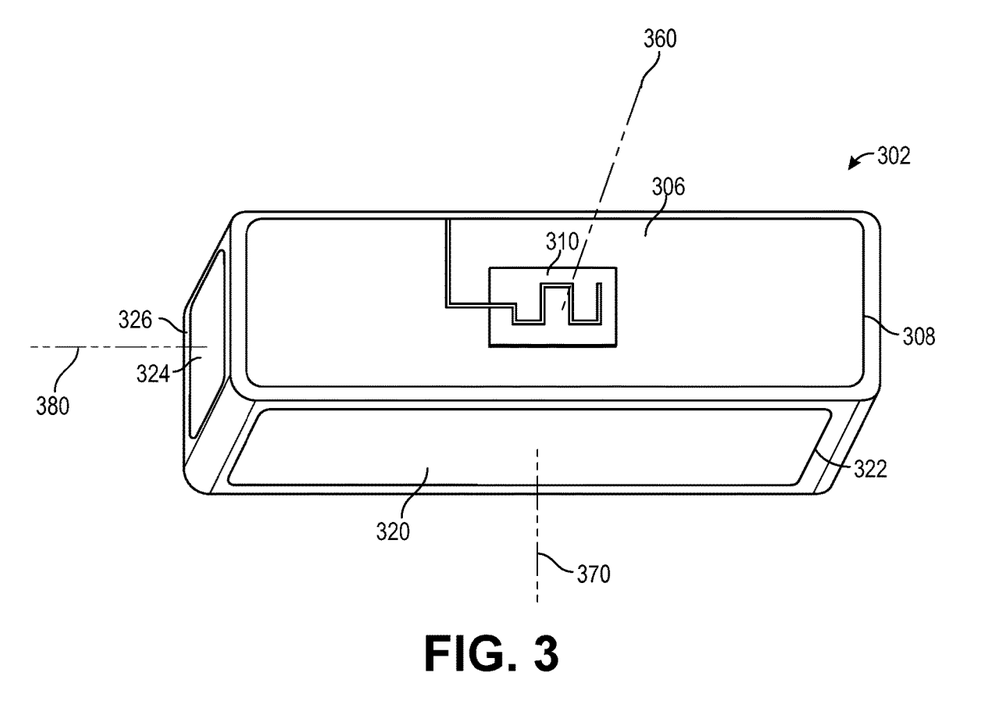
FIG. 3 illustrates an implantable device, according to at least one example.

FIG. 3 shows an example of an implantable device 302 having multiple receiving coils for charging and/or powering the implantable device 302, according to at least one example. The implantable device 302 includes multiple receiving coils each having a low profile, thereby reducing the overall size and footprint of the implantable device 302. On a first side 340, e.g., an upper surface of the implantable device 302 is a PCB 306 having a communication device and first receiving coil 308 similar to other examples described herein. Similarly, a second receiving coil 322 is positioned on a second side 320 of the implantable device 302. The second receiving coil 322 may be part of a PCB or be directly connected to the implantable device housing as described above, which may also include a communication device 310. A third receiving coil 326 is positioned on a third side 324 of the implantable device 302. The third receiving coil 326 may also be on a PCB or other substrate or be directly connected to the housing of the implantable device 302.

In some examples, the first receiving coil 308, second receiving coil 322, and third receiving coil 326 are electrically connected to a power management system of the implantable device (not shown). The power management system includes one or more rectifiers and at least one current combination device arranged and configured to rectify AC signals from each of the coils into DC signals and combine them to produce a single DC current for supplying power to charge or operate the implantable device 302.

The example shown in FIG. 3 may have a more compact footprint than other implantable devices, as described herein. In some instances, implantable devices do not require continuous power supplies, but only require power during a treatment time. In such instances, the implantable device 302 may be configured to receive power to operate the implantable device 302 but may not contain a battery or battery charging system. The exclusion of a battery and battery charging system may allow the implantable device 302 to have an even further compact footprint but still function as needed. An additional benefit of the example shown in FIG. 3 is that the implantable device 302 is orientation agnostic with respect to wireless power. For example, in some cases, implantable devices may become disturbed or rotate, move, or otherwise shift within the body of a patient following placement by a surgeon. In typical implantable devices, a change in the orientation of the implantable device can have large impacts on the ability of the device to receive wireless power due to a reduction in area exposed to the EM field produced by the wireless charger. An implantable device 302 including multiple receiving coils, which can additively contribute to a power supply, allows the implantable device 302 to receive additional transmitted energy even though the implantable device 302 may have moved or shifted within the patient's body. For instance, if the implantable device were to rotate, though one of the receiving coils may not be ideally aligned with the wireless charger, a second, third, or other receiving coils will be able to mitigate the negative effects on charging resulting from rotation of the device.

In some examples, the implantable device 302 may have one or more receiving coils positioned on each of the outer surfaces of the implantable device 302. For example, in the case of an implantable device 302 with a shape resembling a rectangular solid, each of the six outer faces may include a receiving coil, whether on a PCB, some other substrate, or directly attached to the implantable device 302. Such an example would be direction agnostic with respect to charging, and would therefore require less time and effort to ensure a specific orientation during surgical placement, as with typical implantable devices.

The first receiving coil 308 has a first center axis 360 extending in a first direction. The second receiving coil 322 has a second center axis 370 extending in a second direction. As shown in FIG. 3, the first direction and the second direction are perpendicular to each other. In some other examples, the first direction and the second direction may be the same or different other than perpendicular to each other. For example, the first direction may differ from the second direction by a few degrees or by even more, such as when the first direction and the second direction are perpendicular or near perpendicular to each other. The external surface geometry of the implantable device may have a curvature or angle which results in the first direction and the second direction differing by only a few degrees.

The third receiving coil 326 has a third center axis 380 extending in a third direction. The third center axis and third direction may be different from both the first direction and the second direction. In some examples, the third direction may be the same or similar to at least one of the first direction and/or the second direction. As shown in FIG. 3, the third direction is perpendicular or nearly perpendicular to both the first direction and the second direction. As described above, the difference between the third direction and the first and/or second direction may vary and be any angle including perpendicular, an acute angle, an obtuse angle, or a parallel or zero difference.

Figure 4:
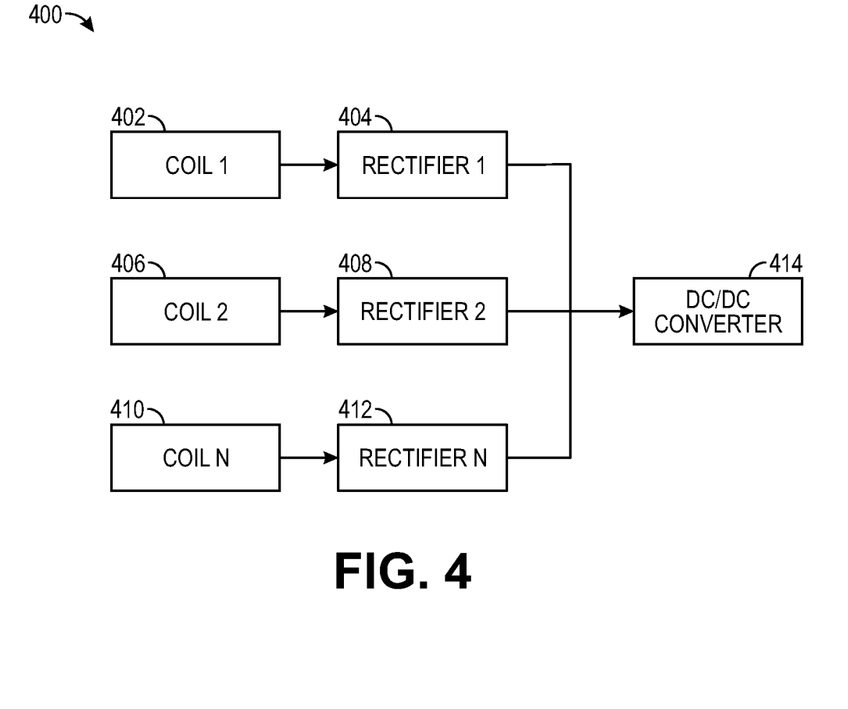
FIG. 4 illustrates a block diagram of a power combination system, according to at least one example.

FIG. 4 shows a block diagram illustrating a block diagram of a power combination system 400 contained within an implantable device 102 including multiple receiving coils, according to at least one example. The power combination system 400 begins with three receiving coils a first receiving coil 402, a second receiving coil 406, and an Nth receiving coil 410. The Nth receiving coil 410 is intended to represent additional coils, such as a third coil, a fourth coil, a fifth coil, etc. though it is shown as a single block. The first receiving coil 402 is electrically connected to a first rectifier 404 which rectifies an AC signal produced by the first receiving coil 402 in response to an EM field passing through the first receiving coil 402. The first rectifier 404, as well as the second rectifier 408 and the Nth rectifier 412, rectify the varying AC signals to a DC voltage and regulates the rectified DC voltage to a level suitable for providing power to an operation of the implantable device 102, such as treatment or charging a battery. The first rectifier 404 as well as the second rectifier 408 and the Nth rectifier 412 may also include matching. The matching may be performed separately of the rectifying, or may be performed simultaneously. Matching may result in a maximization of power transfer and/or minimization of signal reflection within the system 400. In some examples, this may be performed through the use of transformers. The first rectifier 404 can itself include one or more energy storage devices to mitigate high frequency variations in the first receiving coil 402. In some examples, the first rectified 404 may include combinations of inductors and/or capacitors to accomplish some of the functions described herein.-For example, one or more energy storage devices (e.g., a capacitor, an inductor, etc.) can be connected in parallel across the outputs of the first rectifier 404 to regulate the DC supply voltages configured to function as a low-pass filter.

Each of the coils are connected to a rectifier and/or rectifier circuit, as shown in parallel, before being combined at a DC/DC converter 414. The DC/DC converter 414 is a current combination circuit, current converter, or any other suitable electrical or electromechanical device that converts one or more sources of DC power from one voltage level to another. The DC current coming from the first rectifier 404, the second rectifier 408, and an Nth rectifier 412 may be at different voltage levels and the DC/DC converter 414 unifies the different voltage levels and provides them as a single power supply to the implantable device 102. Those with skill in the art will appreciate the numerous ways to achieve this current combination, and such methods or devices are intended to be covered by this disclosure.

Although FIG. 4 is shown providing each receiving coil and rectifier circuit in parallel with each other before being combined together at the DC/DC converter 414, other layouts and configurations are envisioned. For instance, the receiving coils, rectifiers, and DC/DC converter 414 may be laid out in series, with each of the coils connected together in a chain.

Figure 5A:
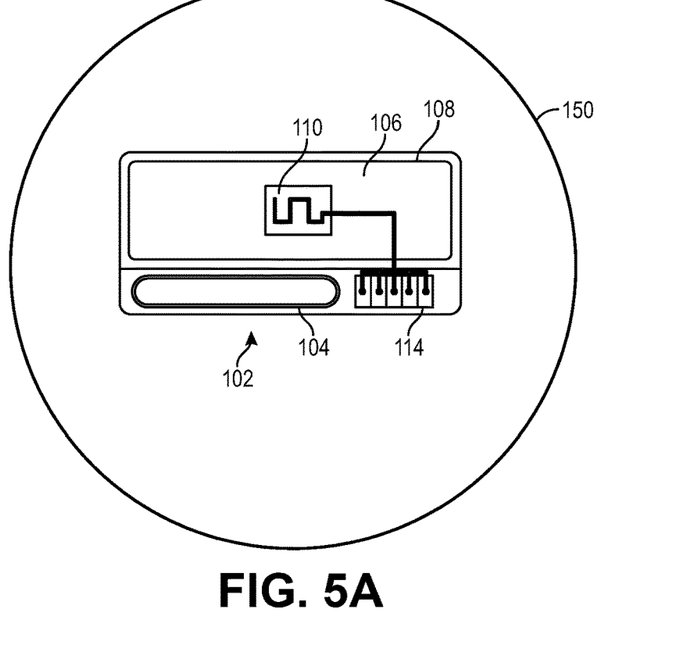
FIG. 5A illustrates a top view of an aligned wireless charging system, according to at least one example.
Figure 5B:
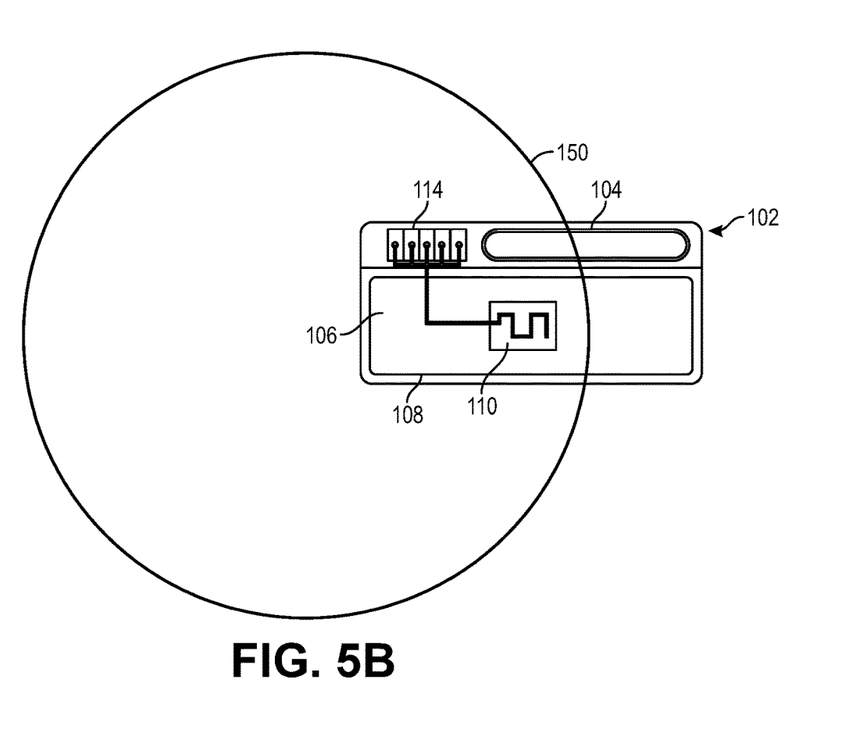
FIG. 5B illustrates a top view of a partially aligned wireless charging system, according to at least one example.

FIGS. 5A and 5B show an implantable device 102 including multiple receiving coils in different alignment locations with a wireless charging coil 150, according to at least one example. In FIG. 5A, the implantable device 102 is shown in an aligned position with the wireless charging coil. In this arrangement, the EM field produced by the wireless charging coil 150 will be readily available for receiving by the primary receiving coil 104 and secondary receiving coil 108 of the implantable device 102. In contrast, in FIG. 5B, the implantable device 102 is shown with a poor alignment of the wireless charging coil 150 and the implantable device 102. In a typical implantable device, the poor alignment would result in either a user continuing to move and/or adjust the position of the wireless charging coil 150 or simply poor wireless charging performance, e.g., if the user is unaware of the poor alignment. In the example shown herein, the primary receiving coil 104 only overlaps a portion of the wireless charger, but the secondary receiving coil 108 is also able to receive a portion of the EM field and make up for, at least in part, the poor alignment of the charger.

Figure 6:
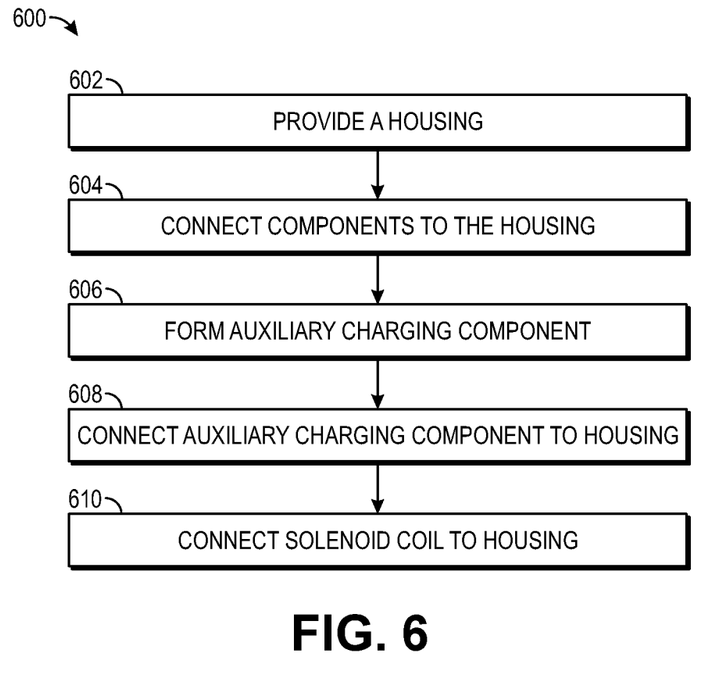
FIG. 6 illustrates an example process for manufacturing an implantable device, according to at least one example.

FIG. 6 shows a method 600 of manufacturing an implantable device as described herein, according to at least one example. At step 602 the process begins by providing a housing for the implantable device. The housing may include the canister and the housing as described herein. The housing may include a metal canister with an attached non-metallic component, or may include a non-metallic housing having magnetic shielding added thereto to protect electronic components of the implantable device after assembly.

At step 604, components of the implantable device are connected to or positioned within the housing provided in the previous step. The components may include components of the multi-coil power system described herein such as a rectifier circuit, a current combination circuit, and electrical connections. The components also include devices and components necessary for carrying out the purpose of the implantable device, such as microprocessors, a battery, electrical leads, and control circuitry. The components may also include a primary receiving coil and associated components such as a rectifier circuit. Step 604 may include several sub-steps or processes, such as first connecting components of the implantable device to a mounting plate and after affixing the components to the mounting plate, covering the components with a cover, the mounting plate and the cover comprising the housing.

Step 606 includes forming an auxiliary charging component. The auxiliary charging component includes the components associated with a secondary receiving coil, such as the receiving coil itself, the PCB, antenna, and electrical connections. The auxiliary charging component is assembled by providing a substrate, which may be a PCB, a ceramic substrate, or other bio-compatible substrate and forming a receiving coil on the substrate either by depositing a conductive coil on the PCB or forming the coil of a conductive wire and affixing it to the substrate. The receiving coil may be formed as a solenoid coil as described above.

At step 608, the method 600 includes connecting the auxiliary charging component to the housing of the implantable device. The auxiliary charging component may be secured to a first side, e.g., a top side of the housing of the implantable device, on an exterior surface. The auxiliary charging component may be sealed, coated, and/or covered to protect the components and electrical connections of the auxiliary charging component but still allow the receiving coil to receive an EM field from a wireless charger. Part of step 608 includes electrically connecting the auxiliary charging component to the rectifier circuit, the current combination circuit, and/or the components of the implantable device.

Step 610 of the method 600, a second receiving coil is connected to the housing. The second receiving coil may be positioned on a PCB or be any of the receiving coils described herein. As part of step 610, the second receiving coil is electrically connected to the components of the implantable device to provide a connection from the second receiving coil to a rectifier and to the current combination circuit, as well as the components of the implantable device.

In some examples, additional receiving coils may be affixed to the exterior of the housing, such as a third, fourth, fifth, and sixth receiving coil. In some examples, the receiving coils may be affixed to the inside of the housing, provided the housing is made of a non-metallic material, and/or designed to allow the EM field to pass through to the receiving coils relatively unimpeded.

The foregoing description of some examples has been presented for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. For example, A or B or C includes any or all of the following alternative combinations as appropriate for a particular usage: A alone; B alone; C alone; A and B only; A and C only; B and C only; and all three of A and B and C.

What is claimed is:

1. An implantable device, comprising:
   a canister;
   a first receiving coil formed on a first printed circuit board that is connected to a first external surface of the canister, wherein the first receiving coil has a first center axis oriented in a first direction, wherein the first receiving coil corresponds to a first surface shape of the first of external surface;
   a second receiving coil formed on a second printed circuit board that is connected to a second external surface of the canister, wherein the second receiving coil has a second center axis oriented in a second direction, wherein the second receiving coil corresponds to a second surface shape of the second external surface, wherein the second surface shape is different from the first surface shape; and
   a current combination circuit electrically connected to the first receiving coil and the second receiving coil, wherein the current combination circuit is configured to combine electrical signals from the first receiving coil and the second receiving coil and to output a single current.

2. The implantable device of claim 1, wherein the first direction is about parallel to the second direction.

3. The implantable device of claim 1, wherein the first direction is different from the second direction.

4. The implantable device of claim 1, wherein:
the implantable device further comprises a third receiving coil formed on a third printed circuit board and connected to a third external surface of the canister, wherein the third receiving coil has a third center axis oriented in a third direction; and
the third receiving coil is electrically connected to the current combination circuit.

5. The implantable device of claim 4, wherein the third direction is different from the first direction and the second direction.

6. The implantable device of claim 1, wherein:
the current combination circuit comprises:
  a first rectifier electrically connected to the first receiving coil;
  a second rectifier electrically connected to the second receiving coil; and
  a current converter; and
the first rectifier and the second rectifier are arranged in parallel and electrically connected to the current converter.

\* \* \* \* \*